US011397930B2

(12) United States Patent
Kellman

(10) Patent No.: US 11,397,930 B2
(45) Date of Patent: Jul. 26, 2022

(54) DOUBLE ENTRY—MULTIVARIABLE ACCOUNTING FOR RECONCILIATION OF BANK TRUST ACCOUNTS

(71) Applicant: Edward Kellman, West Bloomfield, MI (US)

(72) Inventor: Edward Kellman, West Bloomfield, MI (US)

( * ) Notice: Subject to any disclaimer, the term of this patent is extended or adjusted under 35 U.S.C. 154(b) by 0 days.

(21) Appl. No.: 16/706,278

(22) Filed: Dec. 6, 2019

(65) Prior Publication Data

US 2021/0174319 A1 Jun. 10, 2021

(51) Int. Cl.
| | |
|---|---|
| *G06Q 20/10* | (2012.01) |
| *G06Q 40/02* | (2012.01) |
| *G06Q 40/00* | (2012.01) |
| *G06Q 20/40* | (2012.01) |
| *G06Q 20/04* | (2012.01) |

(52) U.S. Cl.
CPC ............ *G06Q 20/10* (2013.01); *G06Q 20/04* (2013.01); *G06Q 20/40* (2013.01); *G06Q 40/02* (2013.01); *G06Q 40/10* (2013.01); *G06Q 40/12* (2013.12)

(58) Field of Classification Search
CPC ........ G06Q 20/10; G06Q 40/12; G06Q 20/04; G06Q 20/40; G06Q 40/02; G06Q 40/10
USPC ...................................................... 705/3–44
See application file for complete search history.

(56) References Cited

U.S. PATENT DOCUMENTS

| | | | | |
|---|---|---|---|---|
| 6,904,411 | B2 * | 6/2005 | Hinkle | G06Q 40/00 705/1.1 |
| 7,177,834 | B1 | 2/2007 | Maestle | |
| 8,126,798 | B1 * | 2/2012 | Dolan | G06Q 40/025 705/36 R |
| 8,433,634 | B1 * | 4/2013 | Templeman | G06Q 40/02 705/36 R |
| 8,494,927 | B2 | 7/2013 | Blowers | |
| 8,560,442 | B1 * | 10/2013 | Bent | G06Q 40/00 705/39 |
| 9,424,333 | B1 | 8/2016 | Bisignani | |
| 10,616,324 | B1 * | 4/2020 | Kaddoura | H04L 43/04 |

(Continued)

OTHER PUBLICATIONS

Adelowotan et al., "Blockchain Technology and Implications for accounting practice", Puiblisher, Jordan Whitney Enterprises, Inc., ProQuest document ID: 2600979234. (Year: 2021).*

(Continued)

*Primary Examiner* — Frantzy Poinvil
(74) *Attorney, Agent, or Firm* — Endurance Law Group PLC

(57) ABSTRACT

Methods and systems for multivariable reconciliation of trust accounts are disclosed. The methods and systems can include acquiring transaction data for transactions in one or more trust accounts including a plurality of extrinsic variables. A plurality of variable ledgers can be produced from the transaction data and the extrinsic variables, including an account transaction ledger, a customer transaction ledger, and a job transaction ledger. The plurality of variable ledgers can then be reconciled internally and amongst the other variable ledgers. The reconciled overlapping data between the account transaction ledger, the customer transaction ledger, and the job transaction ledger, can then be incorporated to produce a multivariable ledger, which can be presented to or analyzed by an operator through an input device.

18 Claims, 6 Drawing Sheets

(56) References Cited

U.S. PATENT DOCUMENTS

| | | | | |
|---|---|---|---|---|
| 2001/0029475 A1* | 10/2001 | Boicourt | ................ | G06Q 40/02 |
| | | | | 705/30 |
| 2005/0144124 A1* | 6/2005 | Stiff | ....................... | G06Q 40/08 |
| | | | | 705/39 |
| 2016/0379241 A1* | 12/2016 | Badger | .............. | G06Q 30/0226 |
| | | | | 705/14.27 |
| 2017/0004550 A1 | 1/2017 | Shaaban | | |
| 2019/0391540 A1* | 12/2019 | Westervelt | ................ | F02C 9/00 |
| 2020/0034453 A1* | 1/2020 | Sato | ........................ | G06F 16/18 |
| 2020/0394722 A1* | 12/2020 | Drangmeister | ..... | G06F 16/2379 |

OTHER PUBLICATIONS

"Law Trust: Features," Retrieved from the Internet: <https://www.lawyertrustaccount.com/features.html>, Retrieved Dec. 6, 2019 (4 pages).

* cited by examiner

DOUBLE ENTRY—MULTIVARIABLE ACCOUNTING FOR RECONCILIATION OF BANK TRUST ACCOUNTS

BACKGROUND

Field of the Invention

Embodiments disclosed herein generally relate to automated financial monitoring systems and methods. More specifically, embodiments generally relate to financial account monitoring.

Description of the Related Art

A variety of service organizations, such as law firms and title companies, are obligated to maintain detailed records of client funds. These records must provide enough information to ensure that client funds are accurately applied to client accounts and appropriate matters. Law firms or Title companies may request that clients make initial payments or other funds as a retainer or deposit, to be held in trust as legal or other expenses arise. In these situations, law firms, title companies, or other service organizations need to store funds in special type of trust account called an Interest on Lawyer's Trust Account (hereinafter "IOLTA") or Trust Account. Overpayments, bank charges, fees, interest, and other customer funds are also stored in your IOLTA account. The trust account is generally a single account which into which multiple client funds are deposited and drawn upon for various legal or title company work.

Many law firms rely on standard accounting software to track the deposits, withdrawals, interest accrued, and other financial events related to the IOLTA or Trust account. Unfortunately, standard double entry accounting software has limited capabilities regarding verification between account activities. Further, said double entry accounting software is not configured to handle certain transactions related to IOLTA imposed by and on law firms, to satisfy legal requirements, state bars, and the ABA. Therefore, a law firm needs a system that can track and manage IOLTA and other trust account transactions in a reliable manner. The present disclosure is directed to this and other shortcomings of the aforementioned domains.

SUMMARY

Embodiments disclosed herein generally relate to systems and methods for multivariable double entry account reconciliation. In one embodiment, a multivariable accounting system for reconciliation of trust accounts is disclosed. The multivariable accounting system can include one or more processors and a memory communicably coupled to the one or more processors. The memory can store an acquisition module comprising instructions that when executed by the one or more processors cause the one or more processors to acquire transaction data for transactions in one or more trust accounts and corresponding entries in one or more recipient accounts through a data input interface, the transaction data including one or more account balances held in the one or more trust accounts, one or more customers receiving one or more offerings, and one or more jobs related to the one or more transactions. The memory can further store a reconciliation module comprising instructions that when executed by the one or more processors cause the one or more processors to reconcile the account transaction ledger for the recipient account balance against the trust account balance, the account transaction ledger being the portion of the transaction data affecting a selected account balance of the one or more trust account balances, to reconcile customer transaction ledger for the recipient account balance against the trust account balance, the customer transaction ledger being the portion of the transaction data related to a selected customer of the one or more customers, and to reconcile the job transaction ledger for the recipient account balance against the trust account balance, the job transaction ledger being the portion of the transaction data involving performance of a selected offering of the one or more offerings. The memory can further store an association module comprising instructions that when executed by the one or more processors cause the one or more processors to reconcile the overlapping data between the account transaction ledger, the customer transaction ledger, and the job transaction ledger, the reconciliation producing a data set for the selected customer, the selected account, and the selected offering, and to present an output of the multivariable ledger through an input device to an operator.

In another embodiment, a non-transitory computer-readable medium for multivariable reconciliation of trust accounts is disclosed. The non-transitory computer-readable medium can store instructions that when executed by one or more processors cause the one or more processors to acquire transaction data for transactions in one or more trust accounts and corresponding entries in one or more recipient accounts, the transaction data including one or more account balances held in the one or more trust accounts, one or more customers receiving one or more offerings, and one or more jobs related to the one or more transactions. The non-transitory computer-readable medium can further store instructions to reconcile the account transaction ledger for the recipient account balance against the trust account balance, the account transaction ledger being the portion of the transaction data affecting a selected account balance of the one or more trust account balances. The non-transitory computer-readable medium can further store instructions to reconcile customer transaction ledger for the recipient account balance against the trust account balance, the customer transaction ledger being the portion of the transaction data related to a selected customer of the one or more customers. The non-transitory computer-readable medium can further store instructions to reconcile the job transaction ledger for the recipient account balance against the trust account balance, the job transaction ledger being the portion of the transaction data involving performance of a selected offering of the one or more offerings. The non-transitory computer-readable medium can further store instructions to reconcile the overlapping data between the account transaction ledger, the customer transaction ledger, and the job transaction ledger, the reconciliation producing a data set for the selected customer, the selected account, and the selected offering. The non-transitory computer-readable medium can further store instructions to present an output of the multivariable ledger through an input device to an operator.

In another embodiment, a method for multivariable reconciliation of trust accounts is disclosed. The method can include acquiring transaction data for transactions in one or more trust accounts and corresponding entries in one or more recipient accounts, the transaction data including one or more account balances held in the one or more trust accounts, one or more customers receiving one or more offerings, and one or more jobs related to the one or more transactions. The method can further include reconciling account transaction ledger for the recipient account balance against the trust account balance, the account transaction ledger being the portion of the transaction data affecting a selected account balance of the one or more trust account balances. The method can further include reconciling customer transaction ledger for the recipient account balance against the trust account balance, the customer transaction ledger being the portion of the transaction data related to a selected customer of the one or more customers. The method can further include reconciling job transaction ledger for the recipient account balance against the trust account balance, the job transaction ledger being the portion of the transaction data involving performance of a selected offering of the one or more offerings. The method can further include reconciling the overlapping data between the account transaction ledger, the customer transaction ledger, and the job transaction ledger, the reconciliation producing a data set for the selected customer, the selected account, and the selected offering. The method can further include presenting an output of the multivariable ledger through an input device to an operator.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The systems and methods described herein disclose multivariable accounting for maintenance and reconciliation of trust accounts. Said systems and methods can include a modified double entry accounting approach. In one or more embodiments, the multivariable accounting can be applied for tracking general company financial performance with the inclusion of one or more extrinsic variables. Extrinsic variables, as used herein, refer to variables not directly related to the transaction itself and related to a transaction by another party. The extrinsic variables can be employed to provide a host of features, such as advanced data management, tracking management, and analysis of the resulting combined company and variable performance. By incorporating these extrinsic variables as part of the transaction data, the systems and methods described herein can track the performance of the variables and related aspects of your business By requiring the entry of two (2) or more extrinsic variables when creating transactions, multivariable double-entry accounting tracks the performance of the two (2) or more variables in the units of money, by tracking balance vs. various asset, liability, and equity accounts. By adding additional extrinsic variables to each transaction, the systems and methods described herein are able to calculate an almost infinite number of unique and distinct accounting ledgers for analysis. Said accounting ledgers can display deposits, withdrawals, and transfers for the individual set of extrinsic variables chosen.

Further, the systems and method described herein can convert each new ledger to a graphical depiction, such as for analysis by an operator. A graphical depiction, as used herein, refers to any form, type, or quantity of visualizations which convey at least a portion of the information contained within or derivable from the ledgers, including any number or types of charts or graphs, such as a pie chart or a histogram. The detail and analysis provided by the systems and methods described herein, allow an operator to track the dollar value of new variables, such as customers, jobs, employees, lawyers, payor, payee, file number, category, or their combinations, in the form of a financial ledger. The systems and methods further generate the resultant ledger instantaneously, in light of the selected extrinsic variables. The embodiments disclosed herein are more clearly described with reference to the figures below.

Figure 1A:
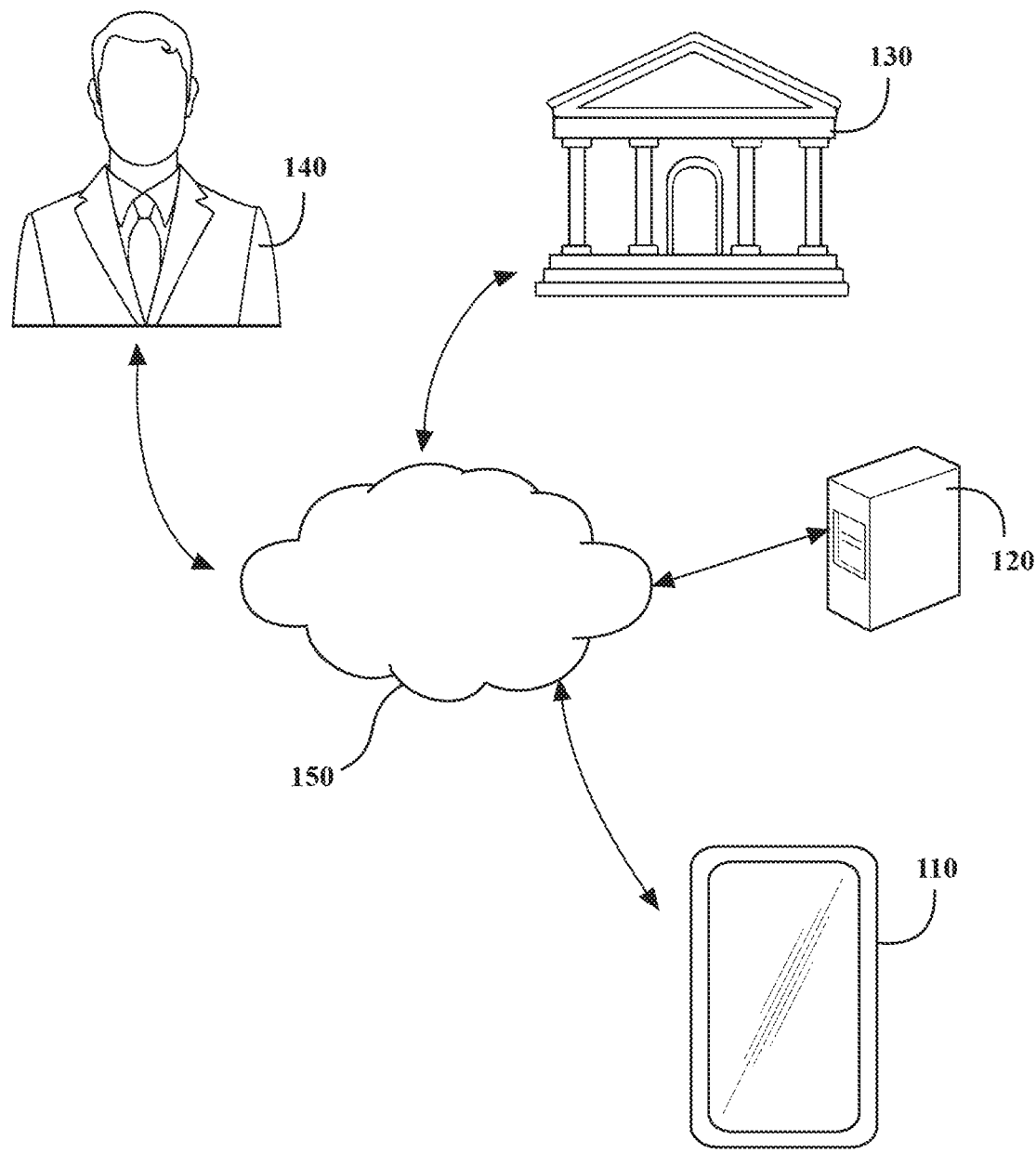
FIG. 1A illustrates a conceptual overview of a multivariable accounting system, according to some embodiments.

FIG. 1A illustrates a conceptual overview of a multivariable accounting system 100, according to some embodiments. The multivariable accounting system 100 is a combination of devices and software and comprises one or more modules. The modules can include instructions for performing the functions described herein, including receiving and recording transaction data, producing and reconciling ledgers created from the transaction data in light of one or more extrinsic variables, and producing subsequent data sets and visual depictions from the extrinsic variable ledgers. The multivariable accounting system 100 can include or incorporate numerous devices and components, such as an input device, shown here as a computing device 110, and/or a server 120. The multivariable accounting system 100 can communicate with devices or components through a network 150, which can include the internet, a local area network, a mesh network, or others. The multivariable accounting system 100 can further receive input from a variety of financial data sources capable of providing financial related information.

Financial data sources can include an institution, depicted here as a financial institution 130, an operator 140, or others. The financial institution 130, as used herein, includes any union, company, or other organization engaged in the business of dealing with financial and monetary transactions. Financial and monetary transactions can include deposits, withdrawals, loans, investments, currency exchange, and others. The operator 140, as used herein, refers to a person or persons interacting with the multivariable accounting system 100 through one or more devices, such as the computing device 110. Though the operator 140 and the financial institution 130 are referred to in their singular form, it is understood that one or more operators 140 and or one or more financial institutions 130 are specifically contemplated in one or more embodiments of the multivariable accounting system 100, as described herein.

The multivariable accounting system 100 is generally configured to allow for the use of extrinsic variables as part of an individualized double-entry accounting scheme. The extrinsic variables are variables which are related to the transaction without being directly involved in the exchange of currency between the two accounts, such as the service provided, the worker name, the customer name, and others. The extrinsic variables can be received from the financial data sources, publically available sources, or others. In some examples, the extrinsic variables can be received from the financial institution 130, the operator 140, or combinations thereof. The extrinsic variables can then be associated to one or more of the transactions in the transaction data, allowing for bookkeeping in light of the extrinsic variable. Thus, the multivariable accounting system 100 can create reconcilable subsets of the available transaction data, generally referred to herein is ledgers, and directly associate the transaction subset to the associated variable.

In double-entry accounting, when a transaction occurs in a first account, such as when a first account is debited or credited, an equivalent transaction occurs in a second account. In this example, the first account would be debited for a first amount and the second account would be credited for the same amount. These amounts can then be compared to reconcile the balances between the accounts. By incorporating multiple variables, such as job, customer, internal accounts, or worker, the multivariable accounting system 100 can create unique data sets related to the variable with overlapping data between them.

This overlapping data can then be used for a secondary reconciliation within the same transaction data. In the multivariable accounting system 100, the transactions entered into a transmitting account are compared to the related transaction entered into a recipient account. Using the job, customer, and internal accounts as examples, the transaction data can be separated based on the job, the customer, and the internal account drawn from. Thus, the transaction data can be subdivided by the multivariable accounting system 100 into job transaction ledger, customer transaction ledger, and account transaction ledger. The job transaction ledger, the customer transaction ledger, and the account transaction ledger can include overlapping data from the transaction data. Thus, the use of multiple extrinsic variables in the multivariable accounting system 100 allows for the creation of double entry bookkeeping at an event level, which can then be internally compared or manipulated to increase verifiability of the transaction details and information available about the variables themselves.

Figure 1B:
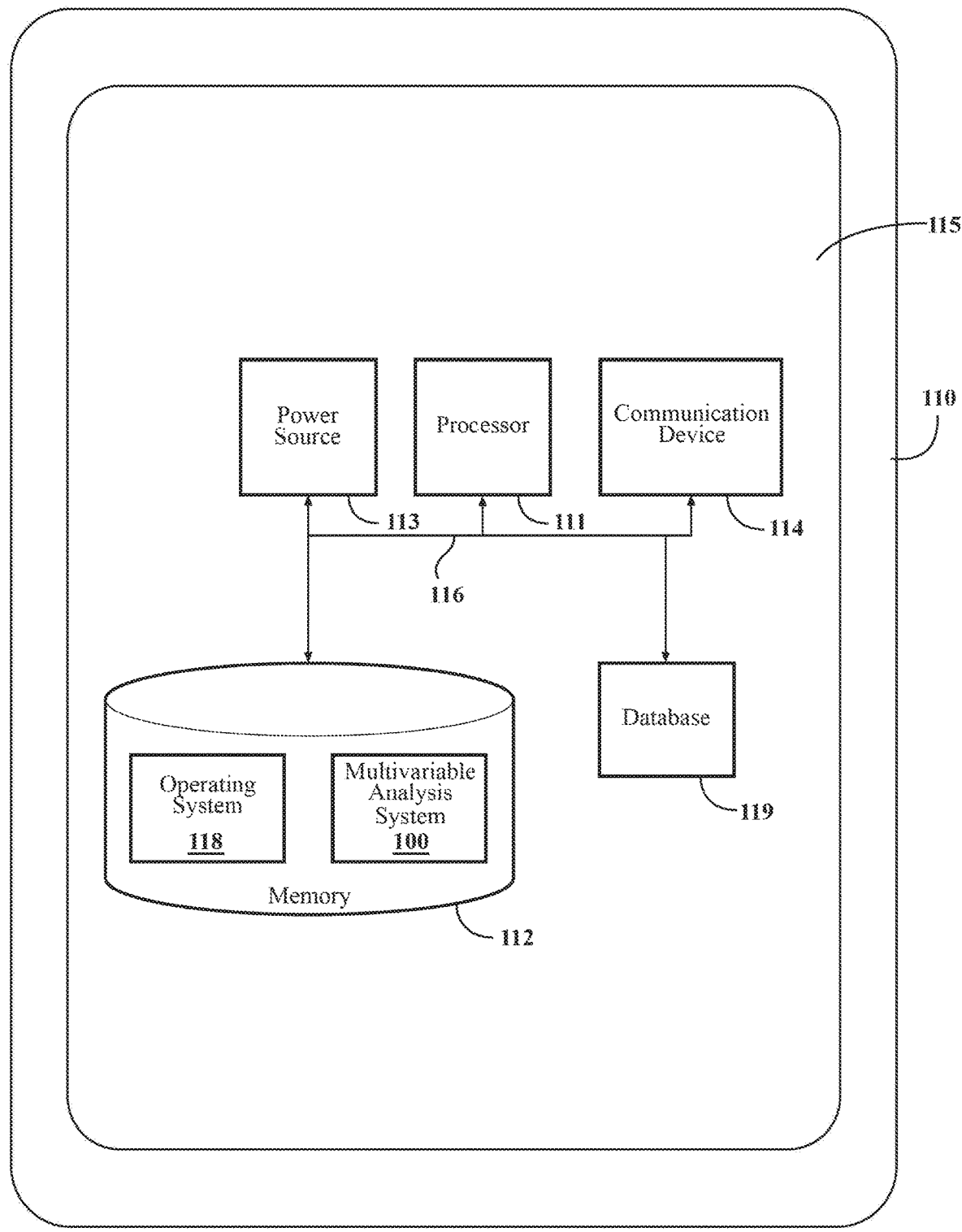
FIG. 1B is an illustration of a computing device adaptable for use with the multivariable accounting system, according to some embodiments.

Referring to FIG. 1B, an example of the computing device 110 adaptable for use with the multivariable accounting system 100 is illustrated. The computing device 110, as shown in FIG. 1B, can be any appropriate type of computing device such as, but not limited to, a personal computer (PC), workstation, embedded computer, or stand-alone device with a computational unit, such as a personal digital assistant (PDA) or a smartphone, digital signal processor (DSP), field programmable gate array (FPGA), or application specific integrated circuit (ASIC). Shown here, the computing device 110 is a smartphone. While arrangements for computing devices 100 will be described herein with respect to a smartphone, it will be understood that embodiments are not limited to smartphones. In some embodiments, the computing device 110 can be any other form of computing device that, for example, includes the processing and input capabilities to receive data from the operator and perform various accounting functions, and thus benefits from the functionality discussed herein.

Shown here, the computing device 110 can communicate directly or indirectly with the one or more secondary devices, such as the server 120. The computing device 110 can contain various components for performing the functions that are assigned to said computing device. The components can include a processor 111, like a central processing unit (CPU), a memory 112, a power source 113, a communications device 110, one or more input and/or output devices, which can optionally include a touchscreen display 15, and at least one bus 116 that connects the aforementioned components. In some embodiments, these components are at least partially housed within a housing 117. Though described as a secondary device, it is understood that the server 120 can include one or more components described with reference to the computing device 110 without further recitation herein.

The processor 111, which can also be referred to as a CPU, can be a device which is capable of receiving and executing one or more instructions to perform a task as part of a computing device. In one embodiment, the processor 111 can include a microprocessor such as an application specific instruction set processor (ASIP), graphics processing unit (GPU), a physics processing unit (PPU), a DSP, an image processor, a co-processor, or others. Though referenced as the processor 111, it is understood that one or more processors 104 can be used in one or more embodiments described herein, including combinations of processors 104.

The memory 112 is any piece of hardware that is capable of storing data or information. Examples of data or information which can be stored in the memory 112 include, without limitation, data, program code in functional form, and/or other suitable information either on a temporary basis and/or a permanent basis. The memory 112 can include one or more modules that include computer-readable instructions that, when executed by the processor 111, cause the processor 11I to perform methods and functions that are discussed herein. The memory 112 can include volatile and/or non-volatile memory. The memory 112 can further include a computer-readable storage medium. Examples of suitable memory 112 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The memory 112 can be a component of the processor(s) 104, or the memory 112 can be operably connected to the processor(s) 104 for use thereby. The memory 112 can include an operating system 118, such as LINUX. The operating system 118 can include batch, live, time sharing, real-time, and other types of operating systems. The operating system 118, as described herein, can include instructions for processing, accessing, writing, storing, searching data, or other functions as selected by the operator for controlling and providing an interface with the computing device 110. As used herein, the operator can be a physician, a technician, or a third party applying one or more components of the embodiments described herein. The memory 112 can include communications procedures for communicating with the network 150, another computing device, and/or the server 120.

The communication device 114 can be wired or wireless connection components and/or software allowing the computing device 110 to communicate with another computing device 110. The communication device 114 can allow communication with devices either locally or remotely, such as over a network protocol (e.g., Ethernet or similar protocols). In one example, the computing device 110 is connected to the network 150 using the communication device 114. The communication device 114 can further be connected with remote devices associated with another computing device 110. In one example, the communication device 114 of the computing device 110 is connected with the server 120 through the network 150. In further embodiments, the computing device 110 can connect with the financial institution 130, allowing access to real-time transaction data from electronic financial records as they arise.

The computing device 110 can further include the multivariable accounting system 100 or components thereof. As described herein, certain components of the multivariable accounting system 100 can be stored locally in the computing device 110, in the computing device 110 at a remote location, such as a server, or in combinations thereof. As such, one or more embodiments of the multivariable accounting system 100 can include the multivariable accounting system 100, modules thereof, or components thereof as being stored, collected, created, compared or otherwise made available from the memory 112 or the database 122 of the computing device 110. When stored as part of the computing device 110, the multivariable accounting system 100 can access the computing device 110, another computing device 110, one or more sensors, or other devices through the communications device 110 and the network 150, allowing for continuity between the one or more components which comprise the multivariable accounting system 100, as disclosed herein.

Figure 2:
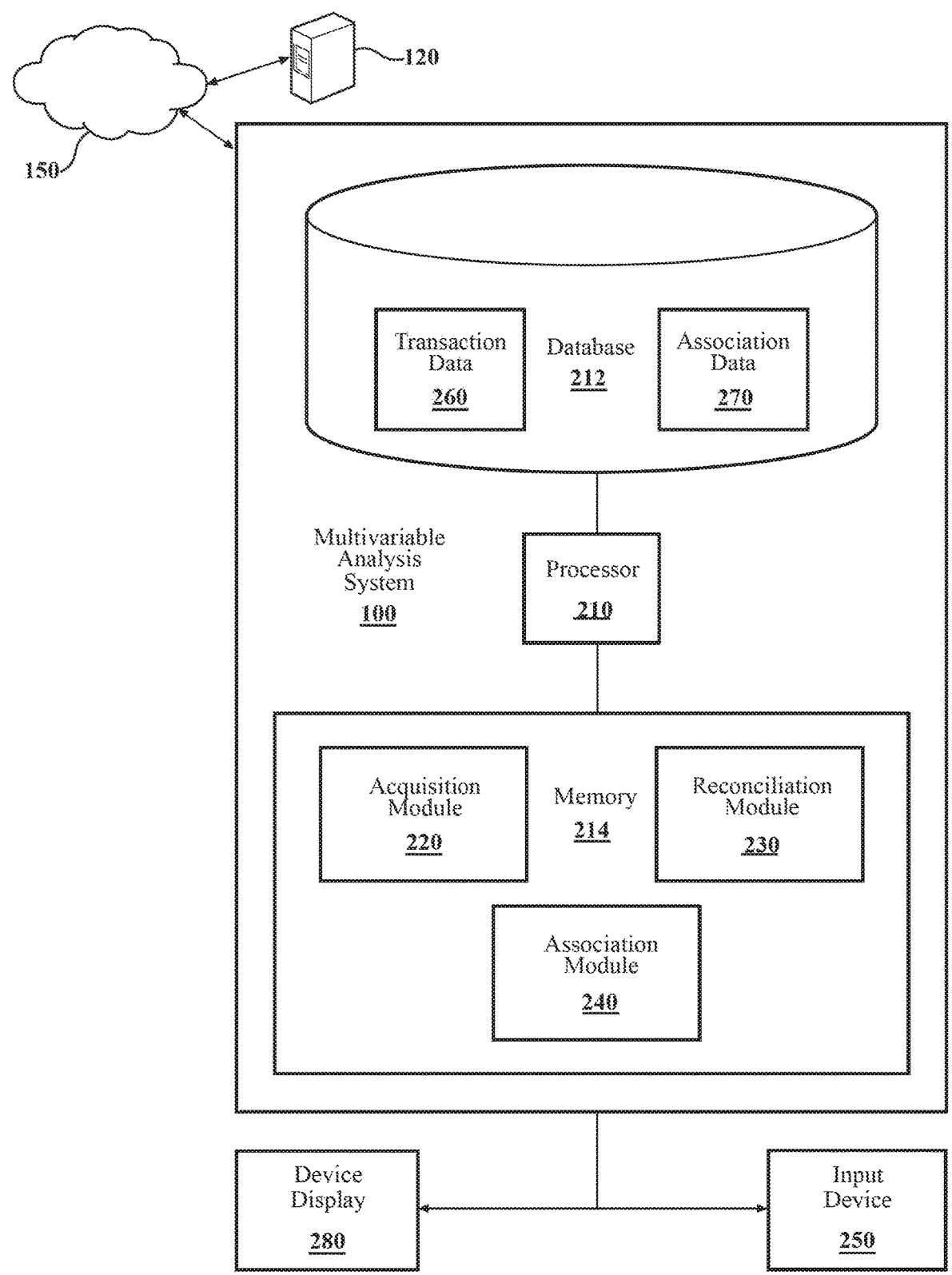
FIG. 2 depicts a schematic diagram of the multivariable accounting system, according to some embodiments.

The discussion of the multivariable accounting system 100 begins at FIG. 2, with an illustration of the multivariable accounting system 100, according to some embodiments. The multivariable accounting system 100 provides an advanced double entry accounting system incorporating multiple extrinsic variables. Through the multivariable accounting system 100, an operator 140 can create entries for one or more accounts, alongside one or more extrinsic variables which are associated with the entries. The multivariable accounting system 100 can then process those entries and associations to allow for analysis of any combination of those entries alongside the extrinsic variables. The multivariable accounting system 100 can further present, in video, audio, or combinations thereof, any and all combinations of entries and associations to extrinsic variables to the operator 140. As well, the multivariable accounting system 100 can use data related to the extrinsic variables to enhance the reconciliation process and create more reliable data sets.

The multivariable accounting system 100 is shown as including a processor 210. The processor 210 can be the processor 111 from the computing device 110, depicted in FIG. 1B, a substantially similar processor, or a different processor. Accordingly, the processor 210 can be a part of the multivariable accounting system 100, the multivariable accounting system 100 can include the processor 210 as separate from the processor 111, or the multivariable accounting system 100 can access the processor 111 through a data bus or another communication path. Though described herein as the processor 210, it is understood that the processor 210 can include one or more processors and/or combinations of processors of various types, including any or all of those described herein.

The multivariable accounting system 100 can further include memory 214. In one embodiment, the multivariable accounting system 100 includes the memory 214 that stores an acquisition module 220, a reconciliation module 230, and an association module 240. The memory 214 can be a RAM, ROM, a hard disk drive, a flash memory, or other suitable memory for storing the modules 220, 230, and 240. The modules 220, 230, and 240 are, for example, computer-readable instructions that when executed by the processor 210, cause the processor 210 to perform the various functions disclosed herein.

The multivariable accounting system 100 can further include a database 212. The database 212 can be presented in a number of configurations, including as part of the memory 214, as an independent component from the memory 214, as part of a separate memory (distinct from memory 214), or others. The database 212 can include transaction data 260 and association data 270. The multivariable accounting system 100 is configured to apply and associate one or more variables to the transaction data 260. The associated transactions from the transaction data 260 can then be applied by the multivariable accounting system 100 for the creation of one or more reconcilable data sets.

The transaction data 260 can include data from one or more transaction event inputs related to one or more transactions. The transaction event inputs can be transmitted, provided, or otherwise made available from a variety of sources, such as the financial institution 130, the operator 140, or others. The transaction data 260 can include data and information regarding one or more transactions, such as customer names, job types, specific financial types (e.g., retainer), individualized expenses, and others. In some embodiments, the transaction data 260 includes specific transaction amounts, one or more job types, one or more customer names, one or more attorney names, and account name and type. The transaction data 260 or portions thereof can be transmitted through a network 150 from or to the server 120, such as data collected at different points in time or from different computing devices. In further embodiments, the transaction data 260 or portions thereof can be stored locally as part of the computing device 110.

The association data 270 can include information related to data metrics and analysis created through the balancing and the reconciliation of the associated transactions, as described herein. In some examples, the association data 270 includes reconciled transactions for one or more of the available variable types, such as based on job type, customer name, attorney name, account debited or credited, and others. The association data 270 can include both numerical representations and visual representations, such as charts and graphs. Similar to the transaction data 260, the association data 270 or portions thereof can be stored locally as part of the computing device 110, on the server 120, or combinations thereof.

Though the multivariable accounting system 100 is described with reference to the computing device 110, the multivariable accounting system 100 or portions thereof, can be stored in separate components (e.g., secondary computing devices and/or integrated components therein), on the server 120, or others. As such, one or more of the functions of the multivariable accounting system 100 or the modules contained therein, can be performed remotely and transferred to computing device 110 as part of the embodiments described herein.

The multivariable accounting system 100 can begin at the acquisition module 220. The acquisition module 220 can include instructions that, when executed by the processor 210, cause the processor to acquire transaction data for transactions in one or more trust accounts and corresponding entries in one or more recipient accounts. The one or more trust accounts, as used herein, are the accounts at the financial institution 130, where the funds received from a client, but not yet earned, are held in trust. In some embodiments, the one or more trust accounts include one or more retainers received from the client to be drawn upon for future services by one or more attorneys.

In some embodiments, the multivariable accounting system 100 can receive input from the operator 140. The acquisition module 220 can include instructions to present a user interface to the operator 140, such as through the touchscreen display 115 of the computing device 110. The operator 140 can then, through the user interface, enter one or more data parameters about one or more accounts and/or one or more transactions. In further embodiments, the acquisition module 220 can be configured to request extrinsic variable entry for the one or more extrinsic variable categories. Extrinsic variable categories, as used herein, refer to the general category for the extrinsic variable. The extrinsic variable entries are the transaction specific inputs in response to the extrinsic variable category. Here, the acquisition module 220 can include instructions to present an indicator, such as a pop-up, through the user interface. The operator 140 can provide one or more extrinsic variable entries in response to the indicator, which can then be stored as part of the transaction data 260. In one example, the extrinsic variable category can be customer name where the extrinsic variable entry is "Joe Smith." In some embodiments, the extrinsic variable category can include select business aspects related to the transactions, such as customer name, job name, attorney name, account name/type, billable time frame, billed-to-billable ratios, and others.

In further embodiments, the acquisition module 220 can further include instructions allowing for free-form entry of at least one of the one or more extrinsic variable categories. Free-form entry generally refers to unguided and/or unrestrained input for the extrinsic variable categories. In one example, free-form entry of an extrinsic variable category can include a user defined category, such as a typed name or description. The extrinsic variable categories can then be stored as part of the transaction data 260, shown here as part of the database 212.

The acquisition module 220 can further request or call for data about one or more extrinsic variables entries. The multivariable accounting system 100 can be configured to accept input of the extrinsic variable entries from a remote or local source (e.g., the financial institution 130, the operator 140, or others). The input to the multivariable accounting system 100 can include the transaction data in any format, such as a database entry, natural language recognition, speech recognition, or others. The multivariable accounting system 100 can receive the input and organize said input as a data entry to the transaction data 260.

The transaction data 260, as discussed above, can include information about one or more transactions affecting the one or more trust accounts. The acquisition module 220 can store and or organize the transaction data 260 in a variety of formats. In some embodiments, the acquisition module 220 can organize the transaction data 260 as part of the database 212. In further embodiments, the acquisition module 220 can store the transaction data 260 as individual data files, such as text files. The transaction data 260 can include a variety of information which describes or relates to the transaction, such as the transaction amount, the name of the original and recipient accounts, and institutions or individuals involved in the transaction.

The transactional data 260 can be received by the multivariable accounting system 100 in a variety of formats such that the desired information or data about the transaction is captured. In some embodiments, the desired information or data is received through electronic transmission, manual entry, scanned documentation (e.g., scanned checks or bank ledgers), or others. In some embodiments, the acquisition module 220 further comprises instructions to acquire one or more transactional units as part of the transaction data 260. The transactional unit can be a measurement of the transaction or an indicator from the transaction which can be converted to a currency unit for the transaction. The transactional unit can further be combined with one or more multipliers to convert the transactional unit to a currency unit. Examples of a transactional units can include a unit of time, wherein the unit of time can be multiplied by a time multiplier (e.g., a pre-determined cost per unit of time) resulting in a unit of currency. The one or more multipliers can be specific to the transactional unit, specific to one or more of the extrinsic factors (e.g., job or attorney), or general. Further, the multiplier, as used herein, can be used for any form of mathematical calculation. In some embodiments, the multiplier can be a single unit, an equation, or combinations thereof. In yet further embodiments, the multiplier is created or adjusted in light of input from an operator, such as salary, hourly rate, desired currency, discount, or others.

Further, the transaction data incorporated by the acquisition module 220 can include transactional metadata, such as where the transaction originated from, information about the account owner, or other information indirectly related to the transaction event. In some embodiments, the transaction data can include one or more account balances held in the one or more trust accounts, one or more customers receiving one or more offerings, one or more jobs related to the one or more transactions, or combinations thereof.

The acquisition module 220 can further include instructions to produce a plurality of variable ledgers. Variable ledgers, as used herein, refer to one or more ledgers produced with relation to the extrinsic variable from the transaction data. The acquisition module 220 can produce the variable ledgers as a data set within the database 212. The variable ledgers can include some or all available information about the related transaction as associated with the extrinsic variable. Examples of variable ledgers, according to one or more embodiments disclosed herein, can include customer transaction ledgers, job transaction ledgers, account transaction ledgers, attorney transaction ledgers, an operator transaction ledger, a payor transaction ledger, a payee transaction ledger, or combinations thereof.

In some embodiments, the acquisition module 220 can include instructions to limit the variable ledgers based on variable type or variable instance of the extrinsic variable. Variable type, as used herein, generally refers to a subcategory of the extrinsic variable that encompasses one or more variable instances. Some examples of variable type can include job categories (e.g., criminal prosecution services), customer categories (e.g., cash clients), and account categories (e.g., retainer accounts). Variable instances, as used herein, generally refers to a specific occurrence of the variable. Some examples of variable instances can include specific jobs (e.g., State v. Jeff Smith, a Criminal Prosecution case), specific customers (e.g., Donald Jones, a selected cash client), and specific accounts (e.g., the Business Co. retainer account). The variable ledgers can be stored by the acquisition module 220 as part of the database 212, such as by storing the variable ledger as part of the association data 270.

In some embodiments, the variable ledgers can include an account transaction ledger, a customer transaction ledger, and a job transaction ledger. The account transaction ledger is a variable ledger including the portion of the transaction data affecting a selected account balance of the one or more account balances. The customer transaction ledger is a variable ledger including the portion of the transaction data related to a selected customer of the one or more customers. The job transaction ledger is a variable ledger including the portion of the transaction data involving performance of a selected offering of the one or more offerings. Though the variable ledgers are described throughout with reference to the customer transaction ledger, the account transaction ledger, and the job transaction ledger, it is understood that these are only exemplary embodiments. The number and type of variable ledgers available to the multivariable accounting system 100 is only limited by the number of extrinsic variables which are entered.

In creating the account transaction ledger, the acquisition module 220 can further include instructions to categorize the transaction data 260 based on the selected account balance. In some examples, the acquisition module 220 creates the account transaction ledger by excluding elements of the transaction data 260 which do not draw from or otherwise affect the selected account balance. The account transaction ledger can include entries which relate to the selected account balance from the original account, as well as entries which relate to the selected account balance from the recipient account.

In creating the customer transaction ledger, the acquisition module 220 can further include instructions to categorize the transaction data 260 based on the selected customer. In some examples, the acquisition module 220 creates the customer transaction ledger by excluding transactions from the transaction data 260 for which the customer is not liable or otherwise affected by said transaction. In some embodiments, the acquisition module 220 includes instructions to apply the selected customer as a limitation to the transaction data 260, wherein data unrelated and/or not directly related to the selected customer is deleted from the transaction data 260. The customer transaction ledger can include entries which relate to the selected account balance from the original account, as well as entries which relate to the selected account balance from the recipient account.

In creating the job transaction ledger, the acquisition module 220 can further include instructions to categorize the transaction data 260 based on the specified job. In some examples, the acquisition module 220 creates the job transaction ledger by removing unrelated transactions, such as by excluding elements of the transaction data 260 which were not scheduled or drawn from an account in light of performance of the specified job. The excluded elements can be stored in a separate database entry in the database 212 or discarded. The job transaction ledger can include entries which relate to the specified job from the original account, as well as entries which relate to the specified job from the recipient account.

The multivariable accounting system 100 can further include the reconciliation module 230. The reconciliation module 230 can include instructions that, when executed by the processor 210, cause the processor to reconcile the account transaction ledger for the recipient account balance against the trust account balance. The account transaction ledger, as used herein, includes the portion of the transaction data affecting a selected account balance of the one or more trust account balances. The selected account balance is a portion or subcomponent of the one or more trust account balances which can be categorized based on a distinguishing factor, such as being owned by a specific person or held for a specific reason. In some examples, the selected account balance is delineated by the reconciliation module 230 based on the purpose it is held for, such as retainers. In further examples, the selected account balance is delineated by the reconciliation module 230 based on the source or ownership, such as a specific company or customer.

The reconciliation module 230 can further include instructions to reconcile and/or apply the entries in the account transaction ledger to create secondary account data. Secondary account data generally refers to data points or combinations of data points which can be extrapolated from the account transaction ledger, such as specific time frames for account entries, designated financial boundaries for the selected account balance, or other elements as desired by the operator 140 or another operator. In one example, the reconciliation module 230 can include instructions to assess the account transaction ledger for types and timing of account entries which reduce the account balance below a specified value. The secondary account data can be stored as part of the database 212, such as being stored as part of the association data 270.

Further, the reconciliation module 230 can reconcile the account transaction ledger against a secondary reconciliation source. Secondary reconciliation sources can include bank statements, credit card statements, previously entered information, reliability elements, or others as made available to the reconciliation module 230 or elements thereof. The reconciliation module 230 can receive the secondary reconciliation source or information thereof through a variety of mechanisms, such as manual input, scanned documents, publicly available sources, and others. The reconciliation module 230 can then use known factors about various entries to determine the equivalent entry within the secondary reconciliation source, such as dates, times, locations, specific or general value of a given transaction, or others which indicate association between the entries. Thus, the reconciliation module 230 can further include instructions to reconcile the account transaction ledger against secondary reconciliation sources available in light of the account name being the extrinsic variable.

The reconciliation module 230 can further include instructions to reconcile the customer transaction ledger for the recipient account balance against the trust account balance. The customer transaction ledger, as used herein, includes the portion of the transaction data related to a selected customer of the one or more customers. The selected customer is a customer selected by the operator 140. As above, the reconciliation module 230 can include instructions to present an interface such that the operator 140 can select a selected customer for further financial analysis within the multivariable accounting system 100. The interface provided by the reconciliation module 230 can include a list of customers from which to select a specific customer, a free-form entry field, or others such that the operator 140 can provide an appropriate input.

The reconciliation module 230 can further include instructions to reconcile and/or apply the entries in the customer transaction ledger to create a secondary customer data. The secondary customer data generally refers to data points or combinations of data points which can be extrapolated from the customer transaction ledger, such as types of transactions, designated financial boundaries for the selected customer, preferred relationships between the customer and the service organization, or other elements as desired by the operator 140 or another operator. In one example, the reconciliation module 230 can include instructions to assess the customer transaction ledger for the amount spent per attorney, which may indicate which quality of service or interpersonal relationship between the customer and the attorney. The secondary customer data can be stored as part of the database 212, such as being stored as part of the association data 270.

Further, the reconciliation module 230 can reconcile the customer transaction ledger against a secondary reconciliation source. Secondary reconciliation sources can include bank statements, credit card statements, previously entered information, reliability elements, or others as made available to the reconciliation module 230 or elements thereof. Thus, the reconciliation module 230 can further include instructions to reconcile the customer transaction ledger against secondary reconciliation sources available in light of the customer name being the extrinsic variable.

The reconciliation module 230 can further include instructions to reconcile the job transaction ledger for the recipient account balance against the trust account balance. In one or more embodiments, the job transaction ledger is the portion of the transaction data which occurred in consideration for a selected offering of the one or more offerings. Through instructions to the processor 210, the reconciliation module 230 can then reconcile the elements of the job transaction ledger corresponding to the entries in the original account against elements of the job transaction ledger corresponding to entries in the recipient account. The reconciliation module 230 can provide instructions to associate the corresponding entries in the job transaction ledger between the original account and the recipient account. These entries can then be compared by the reconciliation module 230 to assure that they reconcile.

The reconciliation module 230 can further include instructions to reconcile and/or apply the entries in the job transaction ledger to create secondary job data. Secondary job data generally refers to data points or combinations of data points which can be extrapolated from the job transaction ledger, such as specific job types or relation between said job types, transaction amounts based on the job, or other elements as desired by the operator 140 or another operator. In one example, the reconciliation module 230 can include instructions to assess the job transaction ledger for times frames of job performance from acceptance to billing. The secondary job data can be stored as part of the database 212, such as being stored as part of the association data 270.

Further, the reconciliation module 230 can include instructions to reconcile the job transaction ledger against a secondary reconciliation source. Secondary reconciliation sources can be substantially similar to those described above with reference to the account transaction ledger. The reconciliation module 230 can then use known factors about various entries to determine the equivalent entry within the secondary reconciliation source, such as dates, times, locations, specific or general value of a given transaction, or others which indicate association between the entries. Thus, the reconciliation module 230 can further include instructions to reconcile the job transaction ledger against secondary reconciliation sources available in light of the job name or job type being the extrinsic variable.

In some embodiments, the reconciliation module 230 can include instructions to cross associate secondary reconciliation sources based on a related extrinsic variable. Some secondary reconciliation sources may be available or associable based on the connection to a specified extrinsic variable, while not being readily associated to another. In one example, a credit card statement can be unavailable to or undiscovered by the multivariable accounting system 100 based on the specified account alone, where the same credit card statement is readily available to the system 100 based on the customer name. In this instance, the reconciliation module 230 can associate equivalent entries from the secondary reconciliation source based on the second extrinsic variable (e.g., the customer name) to the data set created in light of first extrinsic variable (e.g., the specific account balance). The associated equivalent entries can then be reconciled with entries from the data set created in light of the first extrinsic variable. Further combinations of secondary reconciliation sources being associated based on one or more extrinsic variable associations are specifically contemplated without further recitation herein.

In yet further embodiments, the reconciliation module 230 can include instructions to indicate reliability for one or more of the entries in the transaction data. Some reconciliation sources may be more prone to error than others, and as such are comparatively less reliable than others. The reconciliation module 230 can include instructions to assess the reliability of the entries in the transaction data based on the source. Thus, when a conflict occurs during the reconciliation process, the reconciliation module 230 can select a more reliable source for assimilation into any subsequent transaction data sets. The reconciliation module 230 can further include instructions indicating the substitution, requesting secondary review by the operator 140, or others to ensure the reliability of the substituted transaction data.

Though each of the account transaction ledger, the customer transaction ledger, and the job transaction ledger are described as singular, it is understood that multiple of the same type of extrinsic variable could be analyzed simultaneously thus producing multiple job, customer, account, or other variable type transaction data. Other variable types can be handled by the multivariable accounting system 100 in a substantially similar manner to that which is described with reference to the job, customer, and account extrinsic variables.

The multivariable accounting system 100 can further include the association module 240. The association module 240 can include instructions that, when executed by the processor 210, cause the processor to reconcile the overlapping data between the account transaction ledger, the customer transaction ledger, and the job transaction ledger. In some embodiments, the account transaction ledger, the customer transaction ledger, the job transaction ledger, or combinations thereof, can be compared and reconciled for differences. The resulting comparisons can then be converted by the association module 240 into a format which is usable by an operator 140.

Without intending to be bound by theory, the production of transaction data through bookkeeping, including double entry bookkeeping, can result in errors. Sources of differences can include typographical errors, accounting errors, improper incorporation of transaction data, or others. The association module 240 can include instructions to compare the separated transaction data based on the extrinsic variables (e.g., the account transaction ledger, the customer transaction ledger, and the job transaction ledger). The separated transaction data is internally checked and verified independently during the creation of said data, such as through the use of secondary reconciliation data. Thus, the second reconciliation of the overlapping data by the association module 240 provides a secondary check against various types of accounting errors which may occur during routine accounting.

The association module 240 can further include instructions to incorporate the overlapping reconciled data into a multivariable ledger. The multivariable ledger can include the overlapping data for a plurality of the extrinsic variables, such as for the selected customer, the selected account, the selected offering, other extrinsic variables, or combinations thereof. In some examples, the multivariable ledger can generally include a combination of the data produced by reconciliation of the account transaction ledger, the customer transaction ledger, and the job transaction ledger against one another. In further embodiments, the association module 240 can include instructions to merge the entire data sets, including overlapping portions, such that the resultant multivariable ledger reflects the entirety of the plurality of original data sets. Thus, the subsequent reconciliation of the data through instructions from the association module 240 can increase the reliability of the transaction data while simultaneously allowing for further analysis and presentation of said data.

The association module 240 can include instructions to produce numerical and/or visual analysis as part of or using the multivariable ledger. The numerical and/or visual analysis can include any number of factors presented in any of a variety of manners. In some embodiments, the association module 240 can produce graphs or charts based on the variable or combination of variables as a function of time. In further embodiments, the association module 240 can include instructions to produce one or more visual representations from the multivariable ledger or portions thereof. In one example, the association module 240 can produce a pie graph indicating transaction amount for the specified job as a function of time over a period of a month. In further embodiments, the association module can include instructions to provide and present more detailed analysis based on multiple variables simultaneously. In another example, the association module 240 can produce a line graph indicating performance of the specified job by a specified person for the specified customer and drawn from a specified account over an allotted time period (e.g. a 28 day billing cycle).

The association module 240 can then present said numerical and/or visual analysis to the operator 140 through an input device 250. The input device 250 can be any device capable of receiving and/or transmitting input from the operator 140, as part of the multivariable accounting system 100. The input device 250 can include a touchscreen displays, keyboards, mice, audio recording equipment, or others as can be used for data input. In some embodiments, the input device 250 can be substantially the same to the computing device 110, described with reference to FIG. 1B. As used herein, the term "substantially" includes exactly the term it modifies and slight variations therefrom. Thus, the term "substantially the same" means exactly (e.g., completely) the same, including all described components, and slight variations therefrom. In this particular example, slight variations therefrom can include the addition or subtraction of one or more individual components of the computing device 110. In one example, input device 250 is the touchscreen display 115 of the computing device 110. In this example, the association module 240 receives input from and presents the numerical and/or visual analysis to the operator 140 through the touchscreen display 115 of the computing device 110, described with reference to FIG. 1B.

The association module 240 can further include instructions to receive input from the operator 140 indicating further desired analysis of the multivariable ledger or components thereof. Without intending to be bound by theory, limits in display size and the capabilities of the computing device 110 can also limit the possible number and size of the analyses that can be presented at any given time to the operator 140. As such, the association module 240 can further include instructions such that the operator 140 can select between one or more options and choose desired information and/or desired variables for the numerical and/or visual analysis. In some embodiments, the association module 240 includes instructions to create a drop-down menu listing a variety of known or possible combinations of extrinsic variables and/or secondary transaction data for the operator 140 to select from.

In further embodiments, the association module 240 can include instructions allowing the operator 140 to select from various types of analysis which can be extrapolated from the multivariable ledger or components thereof. Some examples of the various types of analysis which may be made available by the association module 240 can include numerical format, charts (e.g., pie charts), graphs (e.g., line graphs or bar graphs), or others that may be useful to the operator 140, in analyzing the one or more extrinsic variables or combination thereof. The association module can then store the multivariable ledger, including the data points and the numerical and/or visual analysis, as part of the database 212, such as in the association data 270 described with reference to FIG. 2.

Figure 3:
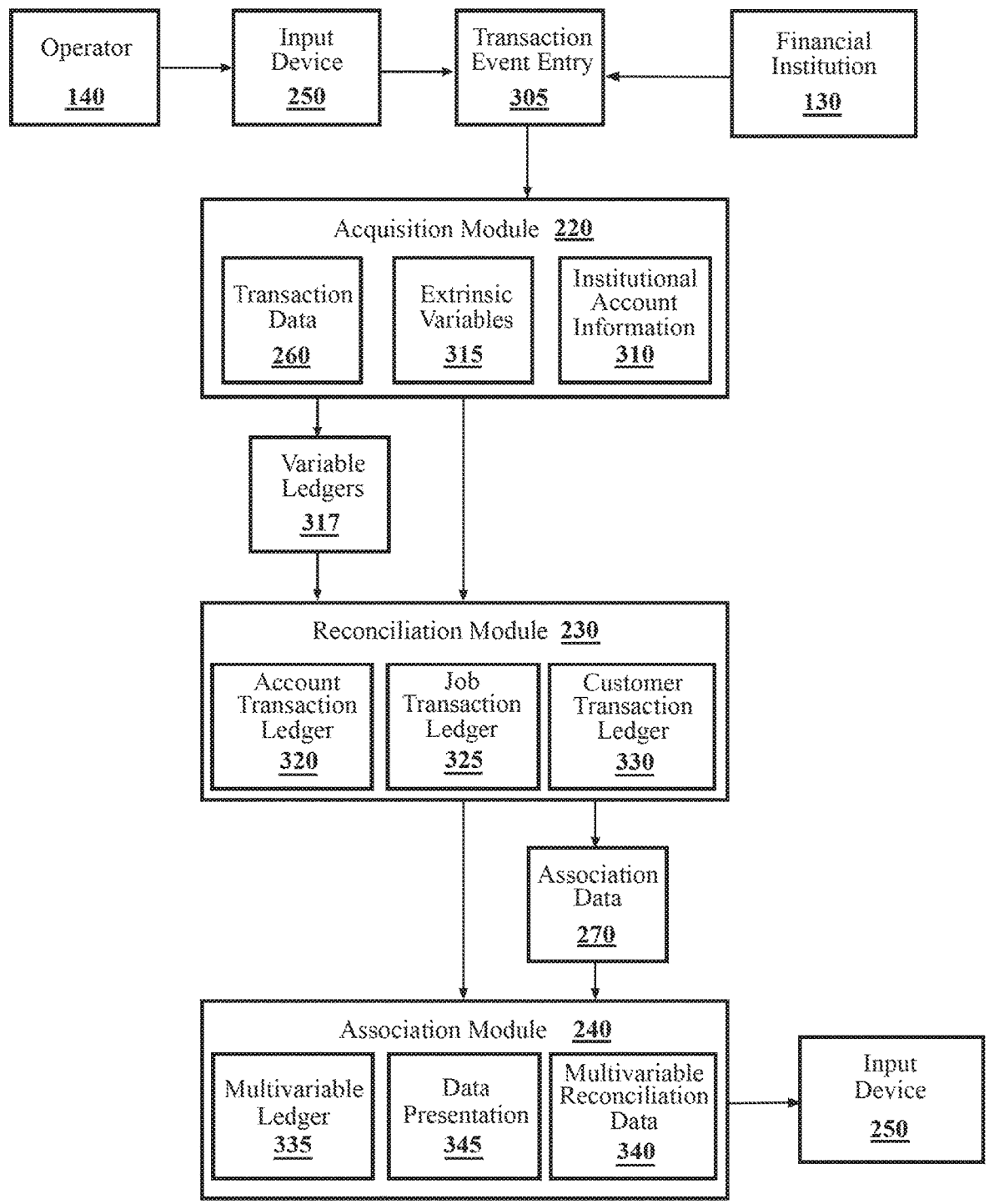
FIG. 3 is a flow diagram for the multivariable accounting system, according to some embodiments.

FIG. 3 depicts a schematic diagram of the multivariable accounting system 100, according to embodiments described herein. The multivariable accounting system 100 uses transaction data 260, as derived from at least transaction event entry 305, and institution account information 310 to reconcile the transaction data 260 based on extrinsic variables 315. The multivariable accounting system 100 can then present analysis to an operator 140. The analysis can provide visual and numerical association of the extrinsic variables to the transaction data 260. The operator 140 can then receive the analysis in the form of an visual depiction, such as a pie chart representing transaction events during the specified period of time. The visual depiction can provide a more thorough understanding of business expenses and financial performance in light of the extrinsic variables.

The multivariable accounting system 100 begins at the acquisition module 220. The acquisition module 220 can include instructions to receive the transaction event entries 305 from one or more sources. The transaction event entries 305 are bookkeeping entries in any form, as received from parties with knowledge of the transactions, such as the financial institution 130, the operator 140, or others. The transaction event entries 305 can be received from the operator 140 through the input device 250, such as by manual input from the operator 140. The acquisition module 220 can then associate the transaction event entries 305 into the transaction data 260 in light of the institutional account information 310. The institutional account information 310 is organizational information or data related to the originating account (e.g., the trust account) and/or the recipient account. The institutional account information 310 can be used by the acquisition module 220 to organize the transactional event entries 305 based on the direction of transactional flow and in light of the extrinsic variables 315. The extrinsic variables 315 can be substantially similar to the extrinsic variables described with reference to FIG. 1.

The acquisition module 220 can then produce one or more variable ledgers 317 from the transaction data 260. In some embodiments, the acquisition module 220 can produce the one or more variable ledgers 317 by extrapolating one or more transactions which relate to the extrinsic variables 315 from the transaction data 260. In one example, the acquisition module 220 incorporates the transaction entries from the transaction data which include a listing of the one or more extrinsic variables 315 into separate variable ledgers 317 associated with the specific extrinsic variable, such as an account name, the job, or customer.

The transaction data 260, the account information 310, and the extrinsic variables 315 can then be forwarded or otherwise made available to the reconciliation module 230 for further data correlation and processing. The reconciliation module 230 can include instructions to produce sub data sets in light of the extrinsic variables 315. In this example, the reconciliation module 230 reconciles the account transaction ledger 320, the job transaction ledger 325, and the customer transaction ledger 330 as received from the acquisition module 220. The account transaction ledger 320, the job transaction ledger 325, and the customer transaction ledger 330 are data from the transaction data 260 which is subdivided and associated based on the customer, account, and the job, as determined from the extrinsic variables 315.

The account transaction ledger 320, the job transaction ledger 325, and the customer transaction ledger 330 can contain transactions related to the associated extrinsic variable, as described above with reference to FIG. 2. For example, the account transaction ledger 320 can contain transactions from the transaction data 260 which at least include the extrinsic variable of the appropriate account type. The reconciliation module 230 can then incorporate the account transaction ledger 320, the job transaction ledger 325, and the customer transaction ledger 330 into the association data 260, as depicted in FIG. 2 as stored in database 212.

The transaction data 260 and the association data 270 can then be made available to the association module 240. The association module 240 can then reconcile the account transaction ledger 320, the job transaction ledger 325, and the customer transaction ledger 330 to produce one or more multivariable ledgers 335. The number of the one or more multivariable ledgers 335 is only limited by the number of extrinsic variables 315 from which the reconciliation module 230 has produced sub datasets. In this example, the reconciliation module 230 has produced three (3) sub data sets (the account transaction ledger 320, the job transaction ledger 325, and the customer transaction ledger 330). As such, the association module 240 can produce nine (9) multivariable ledgers 335. One skilled in the art will understand the variety of available combinations and possibilities based on the disclosure of the production of multivariable ledgers from the extrinsic variables, without further explicit recitation herein.

The association module 240 can further produce multivariable reconciliation data 340. The multivariable reconciliation data 340 is further reconciliation of the transaction data 260 by comparison of overlapping data between the multivariable ledgers 335. The multivariable reconciliation data 340 provides an internal check on the validity of the data points that are incorporated into the multivariable ledgers 335. In one or more embodiments, the multivariable reconciliation data 340 can inform an operator 140 of possible errors (e.g., conflicting entries) in the transaction data 260, provide direction as to how the conflicting entries occurred, and even provide information as to the reliability of each conflicting entry based on the source or other reliability metrics.

The association module 240 can further produce a data presentation 345 from the multivariable ledgers 335 for the operator 140. The data presentation 345 is one or more visual or numerical presentations configured to provide information to the operator about one or more of the multivariable ledgers 335. The data presentation 345 can be provided to the operator 140 through an available communication mechanism, such as the input device 250. The data presentation 345 can be graphically represented, such as in the form of a chart or pie graph. The data presentation 345 can further include time frames, cost-benefit analyses, estimates of monthly inflow and outflow, financial performance per worker or per customer, or others as desired by the operator 140. In some examples, the data presentation 345 can be produced by the association module 240 on demand, such as on request by the operator 140. In further examples, the data presentation 345 can be produced automatically by the association module 240, such as based on determination by the multivariable accounting system 100 that one or more elements of the data presentation 345 or desired by the operator 140 or otherwise beneficial.

The use of multiple extrinsic variables by the multivariable accounting system 100 in the organization, association, reconciliation, and presentation of account entries provides numerous advantages over other accounting systems. The multivariable accounting system 100 creates a visual interface for measurement of financial performance by any combination of the extrinsic variables. Further, the multivariable accounting system 100 provides for secondary validation of account entries, thus further mitigating possible errors. As well, the multivariable accounting system 100 allows for the determination of less tangible aspects of the business, such as personal relationship development.

Figure 4A:
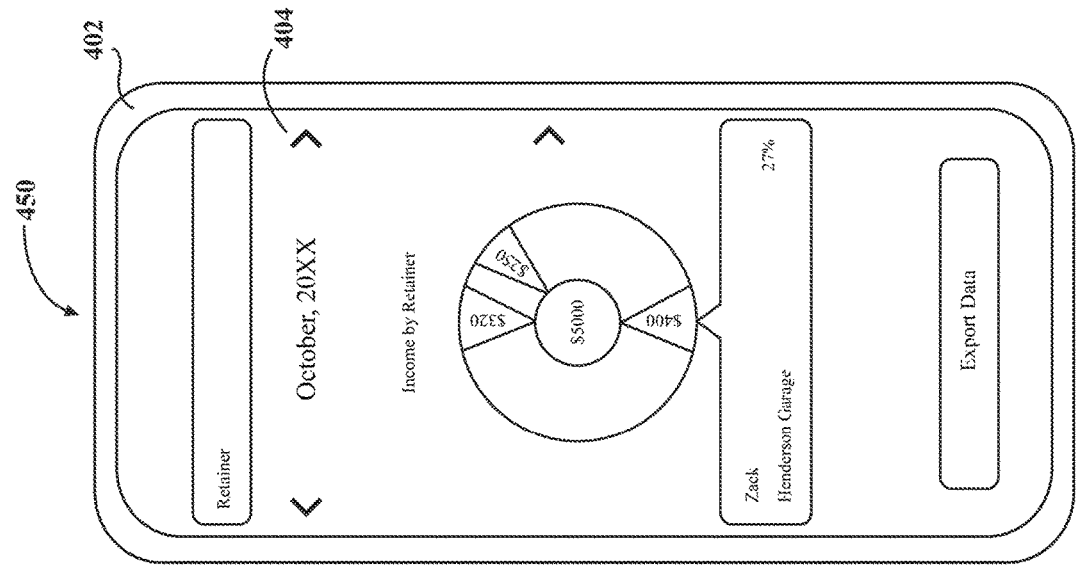
FIGS. 4A and 4B are illustrations of the multivariable accounting system in use by an operator, according to some embodiments.
Figure 4B:
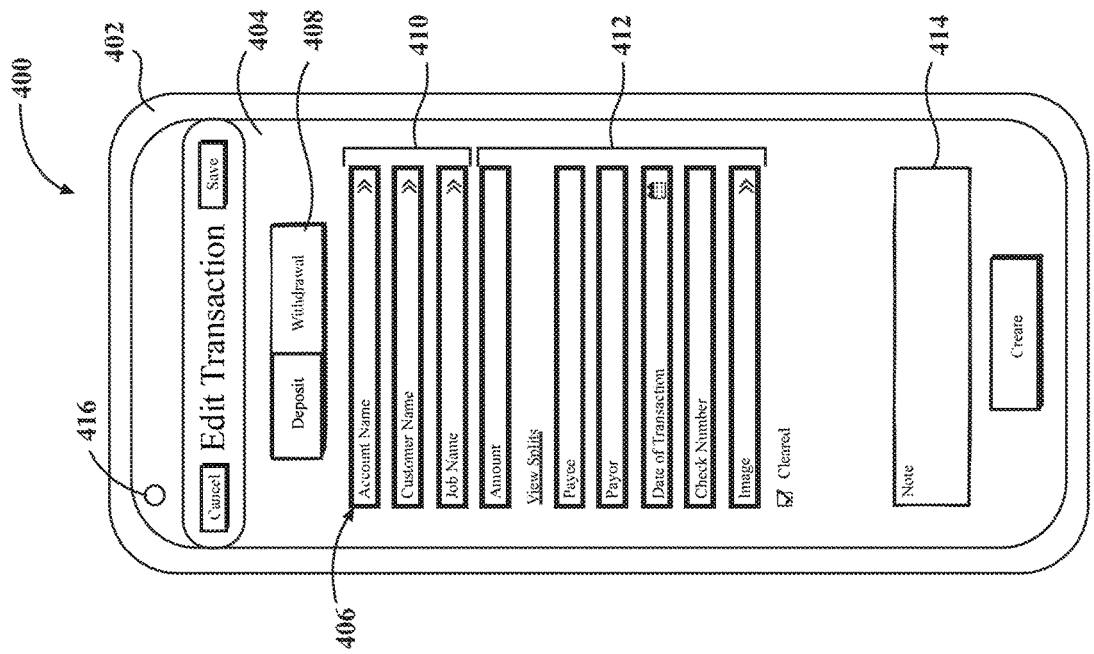

FIGS. 4A and 4B are illustrations of the multivariable accounting system 100 in use by an operator, according to some embodiments. FIG. 4A depicts an illustration 400 of the input device 402 employing the multivariable accounting system 100, described with reference to FIGS. 1-3 above. The input device 402 is depicted with a touchscreen display 404. The input device 402 can be substantially similar to the computing device 410, described with reference to FIGS. 1A and 1B. The touchscreen display 404 depicts a transaction input menu 406. The transaction input menu 406 includes a variety of options for input of the transaction, including a toggle menu 408, one or more extrinsic variable inputs 410, and one or more transaction event inputs 412.

The one or more extrinsic variable inputs 410 can include prefilled or free-form filled options, such that the operator can provide the extrinsic variables as part of the transaction input. In this example, the one or more extrinsic variable inputs 410 are drop-down menus allowing for touch responsive selection of pre-existing inputs on the selected extrinsic variable. The one or more extrinsic variable inputs 410 are depicted here as account name, customer name, and the job name. However, it is understood that the one or more extrinsic variable inputs can be any variable which can be associated with the transaction.

In operation, the operator can select, through the touchscreen display 404, either deposit or withdrawal to inform the multivariable accounting system 100 the type of transaction event to be entered. The multivariable accounting system 100, through the instructions of the acquisition module 220, would then present appropriate options such that the operator could input further information regarding the transaction event. The operator, once more interacting to the touchscreen display 404, can then select or input a specific account name, a specific customer name, and a specific job name to be associated with the transaction event.

The one or more transaction event inputs 412 can include any number of data points to specify the transaction, and are depicted here as including payee, payor, date of transaction, check number, and an image. The operator can then enter a variety of data points for the transaction event through the one or more transaction event inputs 412. Further, the transaction input menu 406 can include a free-form section 414. The free-form section 414 can allow the user to input information considered relevant which falls outside of or is not clearly related to the inputs provided.

In further embodiments, one or more of these inputs under the transaction input menu 406 can be received, produced, or otherwise made available from an external source, such as images, financial institutions, or other sources which provide the desired transaction event data or information. In this example, the acquisition module 220 further presents an image option as part of the transaction event inputs 412. In some embodiments, the acquisition module 220 can receive an image through the input device, such as through a camera 416. In this embodiment, the operator can use the input device 402 two capture an image of the financial document, such as a check. The acquisition module 220 can then store the image as part of the transaction data 260, described above with reference to FIG. 2. Images provided to the acquisition module 220 can be preserved as evidence of the transaction and/or processed to fill in at least one of the one or more transaction event inputs 412.

The operator can provide this input one or more times through the input device 402 to the acquisition module 220 for each transaction as related to each account. The acquisition module 220 can provide instructions to accumulate the data provided by the operator as well as data available from all other sources to produce the transaction data, described with reference to FIG. 2. In one or more embodiments, the acquisition module 220 can connect to one or more network sources, such as the network 150.

The operator can then request the multivariable accounting system 100 to present a reconciliation analysis incorporating one or more of the extrinsic variables through the input device 402. In this example, the multivariable accounting system 100 can then, through instructions from the reconciliation module 230, produce the customer transaction ledger, the account transaction ledger, and/or the job transaction ledger, as requested by the operator. The reconciliation module 230 can then store the transaction data as part of the association data 270, such as in the database 212, described with reference to FIGS. 2 and 3.

FIG. 4B is an illustration 450 of a graph produced by the multivariable accounting system 100, according to some embodiments described herein. The association module 240 then produces the multivariable ledgers 335 and the multivariable reconciliation data 340, in light of the requested analysis by the operator. As depicted in FIG. 4B the association module can then present a graphical representation of the multivariable ledgers, shown here as a pie chart.

In this illustration, the operator is depicted as a graphical analysis for two extrinsic variables, being the account name and the customer name. The touchscreen display 404 depicts income for the account "Retainer" for the month of October on a specific year for the customer "Henderson Garage". The analysis provided by the association module 240 shows the percentage of the retainer having been used for that customer, as well as the specific amount for each of the withdrawals made during that month. The operator can then further refine their analysis through the multivariable accounting system 100, by selecting a specific job or other extrinsic variables as input by the end user.

Discrepancies found during the reconciliation process by the association module 240 can also be displayed through this interface. In some embodiments, the association module 240 presents any of the one or more discrepancies as a pop-up on the touchscreen display 404. In further embodiments, more detailed reconciliation can be provided by the association module 240 for review by the operator.

Thus, FIGS. 4A and 4B display a single example of a wide variety of outputs which are available from the multivariable accounting system 100, as described herein. As shown above, the multivariable accounting system can receive input on one or more transactions from the operator through the user input device. The input can be further distinguished based on extrinsic variables. The transactions, such as those input by the operator through the user interface, can then be analyzed by the multivariable accounting system 100, to provide a detailed graphical presentation based on customer, account, job, or other extrinsic variables.

Figure 5:
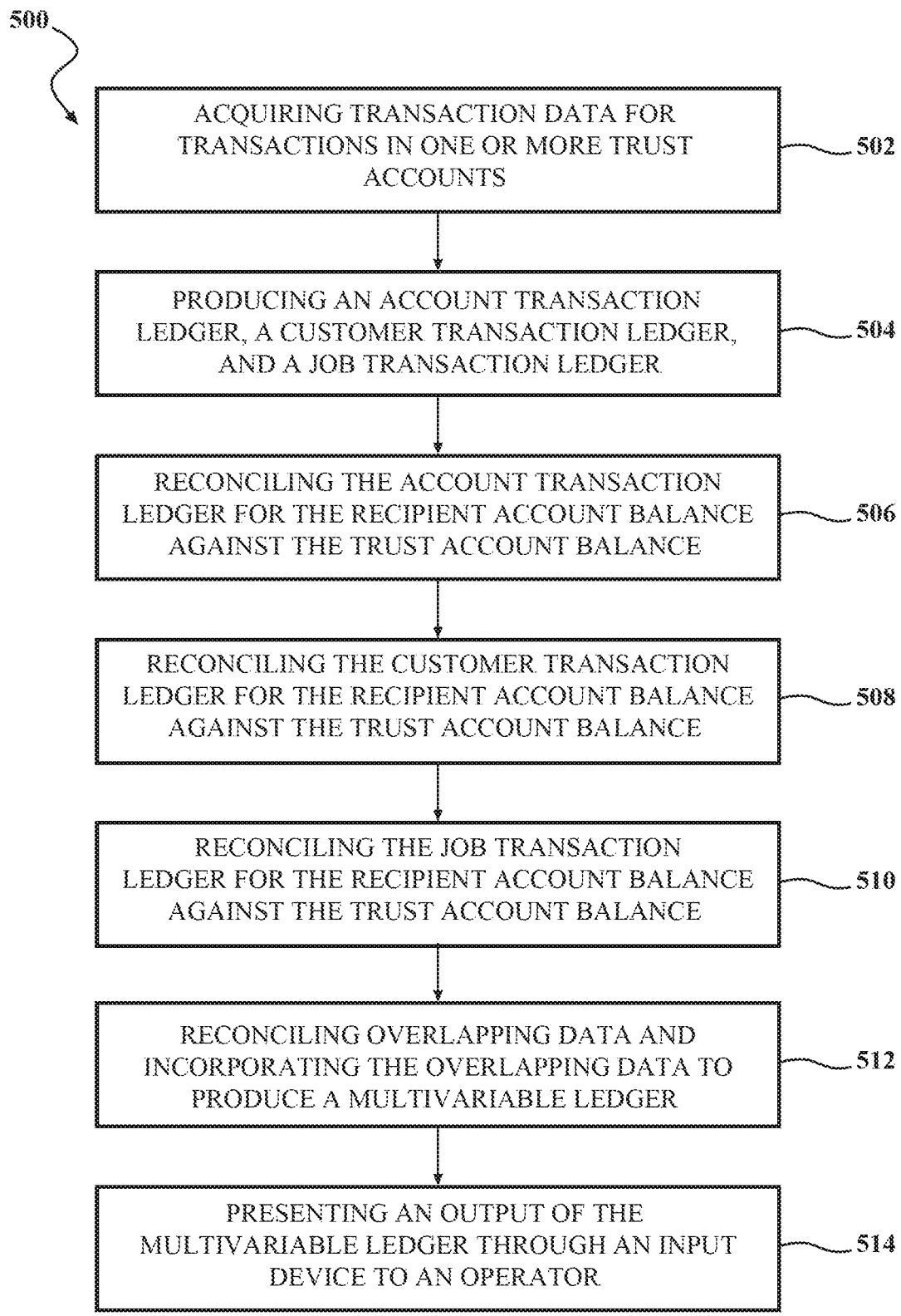
FIG. 5 is a flow diagram of a method for multivariable reconciliation of trust accounts, according to some embodiments.

FIG. 5 is a flow diagram of a method 500 for multivariable reconciliation of trust accounts, according to some embodiments. The method 500 incorporates a plurality of extrinsic variables alongside transaction data to produce one or more multivariable ledgers. The method 500 can further incorporate visual representations of the multivariable ledgers. The multivariable ledgers and the visual representations can clearly associate one or more financial aspects of the business with the related extrinsic variables. As such, the method 500 can provide data and insight into the financial aspects related to a specific set of extrinsic variables, as well as the business as a whole.

The method 500 can include acquiring transaction data for transactions in one or more trust accounts and corresponding entries in one or more recipient accounts, at 502. A plurality of variable ledgers can be produced, the variable ledgers comprising an account transaction ledger, a customer transaction ledger, and a job transaction ledger, at 504. The account transaction ledger for the recipient account balance can be reconciled against the trust account balance, at 506. The customer transaction ledger for the recipient account balance can be reconciled against the trust account balance, at 508. The job transaction ledger for the recipient account balance can be reconciled against the trust account balance, at 510. The overlapping data between the account transaction ledger, the customer transaction ledger, and the job transaction ledger can be reconciled, the reconciliation producing a multivariable ledger, at 512. An output of the multivariable ledger can be presented through an input device to an operator, at 514.

The method 500 can begin by acquiring transaction data for transactions in one or more trust accounts and corresponding entries in one or more recipient accounts, the transaction data including one or more account balances held in the one or more trust accounts, one or more customers receiving one or more offerings, and one or more jobs related to the one or more transactions, at 502. The method 500 can include receiving input from the operator, such as through a user interface presented to the operator. In some embodiments, the user interface can be presented through the touchscreen display of the computing device, such as the computing device 110 described above with reference to FIG. 2.

The operator can then, through the user interface, enter one or more data parameters about one or more accounts and/or one or more transactions. In some embodiments, the method 500 can further include requesting extrinsic variable entry for the one or more extrinsic variable categories. Here, the method 500 can include presenting an indicator, such as a pop-up, through the user interface. The operator can then provide one or more extrinsic variable entries in response to the indicator. In further embodiments, the method 500 can further include allowing for free-form entry of at least one of the one or more extrinsic variable categories. In one example, free-form entry of an extrinsic variable category can include a user defined category, such as a typed name or description.

The method 500 can further include requesting or calling for data about one or more extrinsic variables entries. In some embodiments, the method 500 can further include accepting input of the extrinsic variable entries from a remote or local source. The inputs can include the transaction data in any format, such as a database entry, natural language recognition, speech recognition, or others. In some embodiments, the transaction data can include one or more account balances held in the one or more trust accounts, one or more customers receiving one or more offerings, one or more jobs related to the one or more transactions, or combinations thereof. Further, the method 500 can include incorporating the transaction metadata as part of the transaction data. Transaction metadata can include various data points about the transaction data, such as where the transaction originated from, information about the account owner, or other information indirectly related to the transaction event.

The acquisition and storage of transaction data for the transactions can be performed as part of a system, such as the multivariable accounting system 100, described with reference to FIGS. 2 and 3. The multivariable accounting system 100 can include the acquisition module 220. The acquisition module 220 can include instructions that, when executed by the processor 210, cause the processor to acquire transaction data for transactions in one or more trust accounts and corresponding entries in one or more recipient accounts. The transaction data can be substantially similar to the transaction data 260, described with reference to FIGS. 2 and 3. The transaction data can be collected using the input device 250 in a substantially similar fashion to the collection of the transaction data, described with reference to FIGS. 2 and 3. The transaction data can be stored as part of the transaction data 260. The transaction data 260 can be stored in a database, such as the database 212, described with reference to FIG. 2.

A plurality of variable ledgers can be produced, the variable ledgers comprising an account transaction ledger, a customer transaction ledger, and a job transaction ledger, at 504. The method 500 can include producing the variable ledgers as a data set within a database, such as the database 212 described with reference to FIG. 2. The variable ledgers can include some or all available information about the related transaction as associated with the extrinsic variable. In some embodiments, the method 500 can include limiting the variable ledgers based on variable type or variable instance of the extrinsic variable. In further embodiments, the method 500 can include producing an account transaction ledger, a customer transaction ledger, and a job transaction ledger. The account transaction ledger is a variable ledger including the portion of the transaction data affecting a selected account balance of the one or more account balances. The customer transaction ledger is a variable ledger including the portion of the transaction data related to a selected customer of the one or more customers. The job transaction ledger is a variable ledger including the portion of the transaction data involving performance of a selected offering of the one or more offerings.

The production of the variable ledgers can be performed as part of a system, such as the multivariable accounting system 100, described with reference to FIGS. 2 and 3. The multivariable accounting system 100 can include the acquisition module 220. The acquisition module 220 can include instructions that, when executed by the processor 210, cause the processor to include instructions to produce a plurality of variable ledgers. The variable ledgers, including the account transaction ledger, the customer transaction ledger, and the job transaction ledger, can be substantially similar to the variable ledgers 317, described with reference to FIGS. 2 and 3. The variable ledgers 317 can be stored as part of the association data 270. The association data 270 can be stored in a database, such as the database 212, described with reference to FIGS. 2 and 3.

Account transaction ledger for the recipient account balance can be reconciled against the trust account balance, at 506. The method 500 can include internally comparing and reconciling the transaction entries from the account transaction ledger to assure that all transaction entries reconcile in light of available data from the transaction data. The method 500 further includes reconciling said transaction entries against one or more equivalent entries, which reflect movement of money during the transaction. In some examples, the method 500 can include comparing entries in the account transaction ledger derived from the recipient account against entries in the account transaction ledger derived from the trust account. In further embodiments, the method 500 can include reconciling and/or applying the entries in the account transaction ledger to create secondary account data. In one example, the method 500 can include assessing the account transaction ledger for types and timing of account entries which reduce the account balance below a specified value.

Further, the method 500 can include reconciling the account transaction ledger against a secondary reconciliation source. Secondary reconciliation sources can be substantially similar to the secondary reconciliation sources described with reference to FIG. 2. The method 500 can include receiving the secondary reconciliation source or associated information through a variety of mechanisms, such as manual input, scanned documents, publicly available sources, and others. The method 500 can then include using known factors about various entries within the account transaction ledger to determine the equivalent entry within the secondary reconciliation source, such as dates, times, locations, specific or general value of a given transaction, or others which indicate association between the entries. Thus, the method 500 can further include reconciling the account transaction ledger against secondary reconciliation sources available in light of the account name being the extrinsic variable.

The reconciliation of the account transaction ledger can be performed as part of a system, such as the multivariable accounting system 100, described with reference to FIGS. 2 and 3. The multivariable accounting system 100 can include the reconciliation module 230. The reconciliation module 230 can include instructions that, when executed by the processor 210, cause the processor to reconcile the account transaction ledger for the recipient account balance against the trust account balance. The account transaction ledger can be substantially similar to the account transaction ledger 320, described with reference to FIGS. 2 and 3. The account transaction ledger can be reconciled in a substantially similar fashion to the reconciliation described with reference to FIGS. 2 and 3. The account transaction ledger can be stored as part of the association data 270. The association data 270 can be stored in a database, such as the database 212, described with reference to FIG. 2.

Customer transaction ledger for the recipient account balance can be reconciled against the trust account balance, at 508. The method 500 can include internally comparing and reconciling the transaction entries from the customer transaction ledger to assure that all transaction entries reconcile in light of available data from the transaction data. The method 500 further includes reconciling said transaction entries against one or more equivalent entries, which reflect movement of money during the transaction. In some examples, the method 500 can include comparing entries in the customer transaction ledger derived from the recipient account against entries in the customer transaction ledger derived from the trust account. In further embodiments, the method 500 can include reconciling and/or applying the entries in the customer transaction ledger to create secondary account data.

The method 500 can include reconciling and/or applying the entries in the customer transaction ledger to create a secondary customer data. The secondary customer data generally refers to data points or combinations of data points which can be extrapolated from the customer transaction ledger, such as types of transactions, designated financial boundaries for the selected customer, preferred relationships between the customer and the service organization, or other elements as desired by the operator or another operator. In one example, the method 500 includes assessing the customer transaction ledger for the amount spent per attorney, which may indicate which quality of service or interpersonal relationship between the customer and the attorney.

Further, the method 500 can include reconciling the customer transaction ledger against a secondary reconciliation source. Secondary reconciliation sources can include bank statements, credit card statements, previously entered information, reliability elements, or others as made available to the method 500 or elements thereof. Thus, the method 500 can include reconciling the customer transaction ledger against secondary reconciliation sources available in light of the customer name being the extrinsic variable.

The reconciliation of the customer transaction ledger can be performed as part of a system, such as the multivariable accounting system 100, described with reference to FIGS. 2 and 3. The multivariable accounting system 100 can include the reconciliation module 230. The reconciliation module 230 can include instructions that, when executed by the processor 210, cause the processor to reconcile the customer transaction ledger for the recipient account balance against the trust account balance. The customer transaction ledger can be substantially similar to the customer transaction ledger 330, described with reference to FIGS. 2 and 3. The customer transaction ledger can be reconciled in a substantially similar fashion to the reconciliation described with reference to FIGS. 2 and 3. The customer transaction ledger and the secondary customer data can be stored by the reconciliation module 230 as part of the database 212, described with reference to FIGS. 2 and 3.

Job transaction ledger for the recipient account balance can be reconciled against the trust account balance, at 510. The method 500 can further include reconciling job transaction ledger for the recipient account balance against the trust account balance. In one or more embodiments, the job transaction ledger is the portion of the transaction data which occurred in consideration for a selected offering of the one or more offerings. In some embodiments, the method 500 can then include reconciling the elements of the job transaction ledger corresponding to the entries in the original account against elements of the job transaction ledger corresponding to entries in the recipient account. The method 500 can include associating the corresponding entries in the job transaction ledger between the original account and the recipient account, which can then be compared to assure that no errors exist in the recorded transaction entries.

The method 500 can further include reconciling and/or applying the entries in the job transaction ledger to create secondary job data. Secondary job data generally refers to data points or combinations of data points which can be extrapolated from the job transaction ledger, such as specific job types or relation between said job types, transaction amounts based on the job, or other elements as desired by the operator. In one example, the method 500 can include assessing the job transaction ledger for times frames of job performance from acceptance to billing.

Further, the method 500 can include reconciling the job transaction ledger against a secondary reconciliation source. Secondary reconciliation sources can be substantially similar to those described above with reference to the account transaction ledger. The method 500 can further include using known factors about various entries to determine the equivalent entry within the secondary reconciliation source, such as dates, times, locations, specific or general value of a given transaction, or others which indicate association between the entries. Thus, the method 500 can further include reconciling the job transaction ledger against secondary reconciliation sources available in light of the job name or job type being the extrinsic variable.

In some embodiments, the method 500 can further include cross-associating secondary reconciliation sources based on a related extrinsic variable. Some secondary reconciliation sources may be available or associable based on the connection to a specified extrinsic variable, while not being readily associated to another. In one example, a credit card statement can be unavailable to or undiscovered by the method 500 based on the specified account alone, where the same credit card statement is readily available to the method 500 based on the customer name. In this instance, the method 500 can include associating equivalent entries from the secondary reconciliation source based on the second extrinsic variable (e.g., the customer name) to the variable ledger created in light of first extrinsic variable (e.g., the specific account balance). The associated equivalent entries can then be reconciled with entries from the variable ledger created in light of the first extrinsic variable. Further combinations of secondary reconciliation sources being associated based on one or more extrinsic variable associations are specifically contemplated without further recitation herein.

The reconciliation of the job transaction ledger can be performed as part of a system, such as the multivariable accounting system 100, described with reference to FIGS. 2 and 3. The multivariable accounting system 100 can include the reconciliation module 230. The reconciliation module 230 can include instructions that, when executed by the processor 210, cause the processor to reconcile the job transaction ledger for the recipient account balance against the trust account balance. The job transaction ledger can be substantially similar to the job transaction ledger 325, described with reference to FIGS. 2 and 3. The job transaction ledger can be reconciled in a substantially similar fashion to the reconciliation described with reference to FIGS. 2 and 3. The job transaction ledger and the secondary job data can be stored by the reconciliation module 230 as part of the database 212, described with reference to FIGS. 2 and 3.

The overlapping data between the account transaction ledger, the customer transaction ledger, and the job transaction ledger can be reconciled, the reconciliation producing a data set for the selected customer, the selected account, and the selected offering, at 512. The method 500 can include reconciling the overlapping data between the account transaction ledger, the customer transaction ledger, and the job transaction ledger. In some embodiments, the account transaction ledger, the customer transaction ledger, the job transaction ledger, or combinations thereof, can be compared and reconciled for differences. The method 500 can then include converting the resulting into a format which is usable by an operator, such as graphs or charts. The method 500 can include comparing the separated transaction data based on the extrinsic variables (e.g., the account transaction ledger, the customer transaction ledger, and the job transaction ledger). The separated transaction data is internally checked and verified independently during the creation of said data, such as through the use of secondary reconciliation data. Thus, the second reconciliation of the overlapping data, as included by the method 500, provides a secondary check against various types of accounting errors which may occur during routine accounting.

The method 500 can further include incorporating the overlapping reconciled data into a multivariable ledger. The multivariable ledger can include the overlapping data for a plurality of the extrinsic variables, such as for the selected customer, the selected account, the selected offering, other extrinsic variables, or combinations thereof. In some examples, the multivariable ledger can generally include a combination of the data produced by reconciliation of the account transaction ledger, the customer transaction ledger, and the job transaction ledger against one another. In further embodiments, the method 500 can include merging the entire data sets, including overlapping portions, such that the resultant multivariable ledger reflects the entirety of the plurality of original data sets.

The reconciliation of the overlapping data can be performed as part of a system, such as the multivariable accounting system 100, described with reference to FIGS. 2 and 3. The multivariable accounting system 100 can include the association module 240. The association module 240 can include instructions that, when executed by the processor 210, cause the processor to reconcile the overlapping data between the account transaction ledger, the customer transaction ledger, and the job transaction ledger. The overlapping data and the multivariable ledger can be substantially similar to the multivariable ledger 335, described with reference to FIGS. 2 and 3. The multivariable ledger can be reconciled in a substantially similar fashion to the reconciliation described with reference to FIGS. 2 and 3. The overlapping data and the multivariable ledger can be stored by the association module 240 as part of the database 212, described with reference to FIGS. 2 and 3.

An output of the multivariable ledger can be presented through an input device to an operator, at 512. The method 500 can include producing numerical and/or visual analysis as part of or using the multivariable ledger. The numerical and/or visual analysis can include any number of factors presented in any of a variety of manners. In some embodiments, the method 500 can include producing graphs or charts based on the variable or combination of variables as a function of time. In further embodiments, the method 500 can include producing one or more visual representations from the multivariable ledger or portions thereof. In one example, the method 500 includes producing a pie graph indicating transaction amount for the specified job as a function of time over a period of a month. In further embodiments, the method 500 can include providing and presenting more detailed analysis based on multiple variables simultaneously. In another example, the method 500 can include producing a line graph indicating performance of the specified job by a specified person for the specified customer and drawn from a specified account over an allotted time period (e.g. a 28 day billing cycle).

The method 500 can further include presenting said numerical and/or visual analysis to the operator through an input device, such as the input device 250, described with reference to FIG. 2. The method 500 can further include receiving input from the operator regarding further desired analysis of the multivariable ledger or components thereof. In one example, the method 500 can further include offering the operator 140 to select between one or more options and choose desired information from the numerical and/or visual analysis. In some embodiments, the method 500 further includes presenting a drop-down menu listing a variety of known or possible combinations of extrinsic variables and/or secondary transaction data for the operator to select from. In further embodiments, the method 500 further includes offering the operator a selection from various types of analysis which can be extrapolated from the multivariable ledger or components thereof. Some examples of the various types of analysis which may be made available by the association module 240 can include numerical format, charts (e.g., pie charts), graphs (e.g., line graphs or bar graphs), or others that may be useful to the operator, in analyzing the one or more extrinsic variables or combination thereof.

The production of the numerical and/or visual analysis can be performed as part of a system, such as the multivariable accounting system 100, described with reference to FIGS. 2 and 3. The multivariable accounting system 100 can include the association module 240. The association module 240 can include instructions that, when executed by the processor 210, cause the processor to produce numerical and/or visual analysis as part of or using the multivariable ledger. The association module 240 can then present said numerical and/or visual analysis to the operator 140 through an input device 250. The multivariable ledger can be visually presented in a substantially similar fashion to the presentation described with reference to FIGS. 2 and 3. The multivariable ledger and the visual depictions can be stored by the association module 240 as part of the database 212, described with reference to FIGS. 2 and 3.

Thus, through the use of multiple extrinsic variables, the method 500 provides numerous advantages over other accounting systems in the organization, association, reconciliation, and presentation of account entries. The method 500 can include creating a visual interface for measurement of financial performance by any combination of the extrinsic variables. Further, the method 500 can provide for secondary validation of account entries, thus further mitigating possible errors.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible embodiments. Various embodiments are shown in FIGS. 1-5, but the embodiments are not limited to the illustrated structure or application.

The flowcharts and block diagrams in the figures illustrate the architecture, functionality, and operation of possible embodiments of systems, methods, and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the operator's computer, partly on the operator's computer, as a stand-alone software package, partly on the operator's computer and partly on a remote computer, or entirely on the remote computer or server. In the latter scenario, the remote computer can be connected to the operator's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

The invention claimed is:

1. A multivariable accounting system for reconciliation of trust accounts, comprising:
    one or more processors; and
    a memory communicably coupled to the one or more processors and storing:
    an acquisition module comprising instructions that when executed by the one or more processors cause the one or more processors to acquire transaction data for transactions in one or more trust accounts and corresponding entries in one or more recipient accounts, the transaction data including one or more account balances held in the one or more trust accounts, one or more customers receiving one or more offerings, and one or more jobs related to the one or more transactions, and to produce a plurality of variable ledgers, the variable ledgers comprising an account transaction ledger comprising the portion of the transaction data affecting a selected account balance of the one or more trust account balances, a customer transaction ledger comprising the portion of the transaction data related to a selected customer of the one or more customers, and a job transaction ledger comprising the portion of the transaction data involving performance of a selected offering of the one or more offerings;
    a reconciliation module comprising instructions that when executed by the one or more processors cause the one or more processors to reconcile the account transaction ledger for the recipient account balance against the trust account balance, to reconcile the customer transaction ledger for the recipient account balance against the trust account balance, and to reconcile the job transaction ledger for the recipient account balance against the trust account balance; and an association module comprising instructions that when executed by the one or more processors cause the one or more processors to reconcile the overlapping data between the account transaction ledger, the customer transaction ledger, and the job transaction ledger, the reconciliation including incorporating the overlapping data to produce a multivariable ledger for the selected customer, the selected account, and the selected offering, and to present an output of the multivariable ledger through an input device to an operator.

2. The multivariable accounting system of claim 1, wherein the multivariable ledger further comprises an attorney transaction ledger, an operator transaction ledger, a payor transaction ledger, a payee transaction ledger, or combinations thereof.

3. The multivariable accounting system of claim 1, wherein the acquisition module further comprises instructions to acquire the transaction data as a transactional unit, wherein the transactional unit is measurement of the transaction which can be combined with a multiplier to convert to a currency unit.

4. The multivariable accounting system of claim 1, wherein the output is an interactive pie graph, wherein the operator can select one or more visual elements to review a transaction entry from the multivariable ledger in light of one or more extrinsic variables.

5. The multivariable accounting system of claim 1, wherein the acquisition module further comprises instructions to acquire transaction data through a network from a financial institution.

6. The multivariable accounting system of claim 1, wherein the output is a report indicating one or more transaction entries as associated with each of the variable ledgers.

7. A non-transitory computer-readable medium for multivariable reconciliation of trust accounts and storing instructions:
  at least one processor and a non-transitory computer readable medium coded with instructions and executed by the processor to perform the steps of:
  acquiring transaction data for transactions in one or more trust accounts and corresponding entries in one or more recipient accounts in response to instructions from an acquisition module, the transaction data including one or more account balances held in the one or more trust accounts, one or more customers receiving one or more offerings, and one or more jobs related to the one or more transactions;
  producing a plurality of variable ledgers, the variable ledgers comprising an account transaction ledger comprising the portion of the transaction data affecting a selected account balance of the one or more trust account balances in response to instructions from the acquisition module, a customer transaction ledger comprising the portion of the transaction data related to a selected customer of the one or more customers, and a job transaction ledger comprising the portion of the transaction data involving performance of a selected offering of the one or more offerings;
  reconciling the account transaction ledger for the recipient account balance against the trust account balance in response to instructions from a reconciliation module;
  reconciling the customer transaction ledger for the recipient account balance against the trust account balance in response to instructions from the reconciliation module;
  reconciling the job transaction ledger for the recipient account balance against the trust account balance in response to instructions from the reconciliation module;
  reconciling the overlapping data between the account transaction ledger, the customer transaction ledger, and the job transaction ledger in response to instructions from an association module, the reconciliation including incorporating the overlapping data to produce a multivariable ledger for the selected customer, the selected account, and the selected offering; and
  presenting an output of the multivariable ledger through an input device to an operator in response to instructions from the association module.

8. The non-transitory computer-readable medium of claim 7, wherein the multivariable ledger further comprises an attorney transaction ledger, an operator transaction ledger, a payor transaction ledger, a payee transaction ledger, or combinations thereof.

9. The non-transitory computer-readable medium of claim 7, further comprising instructions to acquire the transaction data as a transactional unit, wherein the transactional unit is measurement of the transaction which can be combined with a multiplier to convert to a currency unit.

10. The non-transitory computer-readable medium of claim 7, wherein the output is an interactive pie graph, wherein the operator can select one or more visual elements to review a transaction entry from the multivariable ledger in light of one or more extrinsic variables.

11. The non-transitory computer-readable medium of claim 7, further comprising instructions to acquire transaction data through a network from a financial institution.

12. The non-transitory computer-readable medium of claim 7, wherein the output is a report indicating one or more transaction entries as associated with each of the variable ledgers.

13. A computer-implemented method for multivariable reconciliation of trust accounts comprising:
  providing at least one processor and a non-transitory computer readable medium coded with instructions and executed by the processor to perform the steps of:
  acquiring, via an acquisition module, transaction data for transactions in one or more trust accounts and corresponding entries in one or more recipient accounts, the transaction data including one or more account balances held in the one or more trust accounts, one or more customers receiving one or more offerings, and one or more jobs related to the one or more transactions;
  producing, via the acquisition module, a plurality of variable ledgers, the variable ledgers comprising an account transaction ledger comprising the portion of the transaction data affecting a selected account balance of the one or more trust account balances, a customer transaction ledger comprising the portion of the transaction data related to a selected customer of the one or more customers, and a job transaction ledger comprising the portion of the transaction data involving performance of a selected offering of the one or more offerings;
  reconciling, via a reconciliation module, the account transaction ledger for the recipient account balance against the trust account balance;

reconciling, via the reconciliation module, the customer transaction ledger for the recipient account balance against the trust account balance;

reconciling, via the reconciliation module, the job transaction ledger for the recipient account balance against the trust account balance;

reconciling, via an association module, overlapping data between the account transaction ledger, the customer transaction ledger, and the job transaction ledger, the reconciliation including incorporating the overlapping data to produce a multivariable ledger for the selected customer, the selected account, and the selected offering; and presenting, via the association module, an output of the multivariable ledger through an input device to an operator.

14. The computer-implemented method of claim 13, wherein the multivariable ledger further comprises an attorney transaction ledger, an operator transaction ledger, a payor transaction ledger, a payee transaction ledger, or combinations thereof.

15. The computer-implemented method of claim 13, further comprising receiving the transaction data as a transactional unit, wherein the transactional unit is measurement of the transaction which can be combined with a multiplier to convert to a currency unit.

16. The computer-implemented method of claim 13, wherein the output is an interactive pie graph, wherein the operator can select one or more visual elements to review a transaction entry from the multivariable ledger in light of one or more extrinsic variables.

17. The computer-implemented method of claim 13, further comprising acquiring transaction data through a network from a financial institution.

18. The computer-implemented method of claim 13, wherein the output is a report indicating one or more transaction entries as associated with each of the variable ledgers.

* * * * *